(12) United States Patent
Yano

(10) Patent No.: US 8,054,043 B2
(45) Date of Patent: Nov. 8, 2011

(54) CAR POWER SOURCE APPARATUS INCLUDING REMOVABLE CUT-OFF MECHANISM TO STOP EQUALIZING BATTERIES

(75) Inventor: Junya Yano, Kasai (JP)

(73) Assignee: Sanyo Electric Co., Ltd., Osaka (JP)

( * ) Notice: Subject to any disclaimer, the term of this patent is extended or adjusted under 35 U.S.C. 154(b) by 427 days.

(21) Appl. No.: 12/385,830

(22) Filed: Apr. 21, 2009

(65) Prior Publication Data

US 2009/0267566 A1    Oct. 29, 2009

(30) Foreign Application Priority Data

Apr. 23, 2008   (JP) .................................. 2008-113069

(51) Int. Cl.
*H02J 7/00* (2006.01)
(52) U.S. Cl. ....................................................... 320/118
(58) Field of Classification Search .................. 320/118, 320/119, DIG. 12, DIG. 25
See application file for complete search history.

(56) References Cited

U.S. PATENT DOCUMENTS

| 5,504,415 | A | * | 4/1996 | Podrazhansky et al. ....... 320/118 |
| 5,644,208 | A | * | 7/1997 | Abiven .......................... 320/118 |
| 5,905,360 | A | * | 5/1999 | Ukita ............................. 320/118 |
| 6,492,791 | B1 | * | 12/2002 | Saeki et al. .................... 320/135 |
| 2009/0033282 | A1 | * | 2/2009 | Ishikawa et al. .............. 320/122 |

FOREIGN PATENT DOCUMENTS

JP          2004-7915         1/2004

* cited by examiner

*Primary Examiner* — Edward Tso
*Assistant Examiner* — Manuel Hernandez
(74) *Attorney, Agent, or Firm* — Wenderoth, Lind & Ponack, L.L.P.

(57) ABSTRACT

The car power source apparatus is provided with a series battery array 10 having a plurality of rechargeable batteries 11 connected in series to supply power to an electric motor that drives the car, equalizing circuits 20 that equalize battery 11 electrical characteristics by discharging or charging each battery 11 of the series battery array 10, a cut-off mechanism 19 connected in series with the series battery array 10 to disconnect the series connection, and a stopping circuit 50, 70, 80 that detects the cut-off state of the cut-off mechanism 19 and controls equalizing circuit 20 operation. In this car power source apparatus, the stopping circuit 50, 70, 80 detects cut-off due to cut-off mechanism 19 removal and stops the equalizing operation performed by the equalizing circuits 20.

22 Claims, 5 Drawing Sheets

CAR POWER SOURCE APPARATUS INCLUDING REMOVABLE CUT-OFF MECHANISM TO STOP EQUALIZING BATTERIES

BACKGROUND OF THE INVENTION

1. Field of the Invention

The present invention relates to a car power source apparatus that has many batteries connected in series to increase output voltage.

2. Description of the Related Art

To increase output, the car power source apparatus increases voltage by having many batteries connected in series. In this power source apparatus, all the series connected batteries are charged by the same charging current, and all batteries are discharged by the same current as well. As a result, if all batteries have exactly the same characteristics, no battery voltage or remaining capacity imbalance will develop between batteries. However, in actuality, batteries with exactly the same characteristics cannot be manufactured. When charging and discharging is performed repeatedly, an imbalance in voltage or remaining capacity develops between batteries. Furthermore, battery voltage imbalance can be the cause of over-charging or over-discharging of a particular battery. To prevent this detrimental effect, a car power source apparatus that detects the voltage of each battery and eliminates any imbalance has been developed (Japanese Patent Application Disclosure 2004-7915).

SUMMARY OF THE INVENTION

In the car power source apparatus cited in Japanese Patent Application Disclosure 2004-7915, a discharge circuit is connected in parallel with each battery that makes up the series connected battery array. The discharge circuits discharge batteries, which have become higher in voltage, to reduce their voltage. This eliminates imbalance between batteries and equalizes battery characteristics.

Equalizing battery characteristics of the series connected battery array is more easily performed when the vehicle is stopped. Therefore, battery equalization is started after detecting that the car is stopped and the ignition switch is OFF. Meanwhile, in a battery array with many batteries connected in series for high output voltage, a cut-off mechanism such as a safety plug is connected in series to allow the vehicle to be worked on safely. The safety plug is connected in series at the mid-region of the many series connected batteries. The safety plug is connected in a detachable fashion, and is removed during times such as vehicle transport, disassembly, or maintenance. When the safety plug is removed, output voltage of the series battery array is cut-off to insure system safety. However, the safety plug can be removed while the car is stopped and the power source apparatus is equalizing batteries. Operation of the equalizing circuits with the safety plug removed is undesirable from a safety point of view. Furthermore, unnecessary electrical power is consumed, and in the worst-case, battery over-discharge can occur and significant battery degradation is possible.

The present invention was developed to address this shortcoming. Thus, it is a primary object of the present invention to provide a car power source apparatus that can detect safety plug removal and suspend equalizing circuit operation to insure safety with the safety plug removed, prevent detrimental effects on the batteries from the equalizing circuits, and avoid battery degradation.

The car power source apparatus of the present invention has the following structure to achieve the object described above. The car power source apparatus is provided with a series battery array 10 having a plurality of rechargeable batteries 11 connected in series to supply power to an electric motor that drives the car, equalizing circuits 20 that equalize battery 11 electrical characteristics by discharging or charging each of the batteries 11 of the series battery array 10, a cut-off mechanism 19 connected in series with the series battery array 10 to disconnect the series connection, and a stopping circuit 50, 70, 80 that detects cut-off due to removal of the cut-off mechanism 19 and controls the equalizing operation of the equalizing circuits 20. In this car power source apparatus, the stopping circuit 50, 70, 80 detects cut-off due to cut-off mechanism 19 removal and stops the equalizing operation performed by the equalizing circuits 20. Since cut-off by the cut-off mechanism is detected and battery equalization is stopped, this power source apparatus has the characteristic that safety can be insured with the cut-off mechanism removed, equalizing circuit detrimental effects on the batteries can be prevented, and battery degradation can be avoided.

In the car power source apparatus of the present invention, the cut-off mechanism 19 can be a safety plug 12 connected in a detachable fashion in series with the series battery array 10. The stopping circuit 50, 70, 80 can detect safety plug 12 removal and suspend the equalizing operation of the equalizing circuits 20.

The car power source apparatus of the present invention can be provided with a main microprocessor unit (MPU) 30 that controls the equalizing circuits 20 and has as its power supply the auxiliary car battery 40 (for electrical accessories). The stopping circuit 50 can suspend the equalizing operation of the equalizing circuits 20 via the main MPU 30. In this power source apparatus, since the main MPU, which controls the equalizing circuits, suspends equalizing circuit operation, equalizing circuit operation can be reliably stopped during cut-off due to cut-off mechanism removal.

The car power source apparatus of the present invention can be provided with a main microprocessor unit (MPU) 30 that controls the equalizing circuits 20 and has as its power supply the auxiliary car battery 40 (for electrical accessories). The stopping circuit 70, 80 can directly suspend the equalizing operation of the equalizing circuits 20 without intervention of the main MPU 30. In this power source apparatus, since the stopping circuit directly stops equalizing circuit operation without going through the main MPU, equalizing circuit operation can be reliably stopped even when the main MPU is not operating.

In the car power source apparatus of the present invention, electrical power can be supplied to power supply circuits 26 of the equalizing circuits 20 from the series battery array 10. The stopping circuit 80 can transmit stopping signals to the equalizing circuits 20 via isolated signal converters 85. In this power source apparatus, since equalizing circuits operate with power supplied from the series battery array, the series battery array can be equalized without consuming power from the auxiliary car battery (for electrical accessories). Further, since stopping signals are transmitted from the stopping circuit to the equalizing circuits through isolated signal converters, equalizing circuits can be stopped by the stopping circuit while maintaining electrical isolation between the equalizing circuits and the stopping circuit. Specifically, equalizing circuits can be stopped by the stopping circuit with the stopping circuit ground line isolated from equalizing circuit ground lines.

In the car power source apparatus of the present invention, the equalizing circuits 20 can be provided with discharge circuits 23 having discharge resistors 22 connected in series with switching devices 23, and control circuits 24 to detect cell voltages of the batteries 11 that make up the series battery array 10 and to control the switching devices 23 ON and OFF.

The car power source apparatus of the present invention can be provided with contactors 17 connected at the output side of the series battery array 10, and a contactor control circuit 32 to control the contactors 17 ON and OFF. In this car power source apparatus, the stopping circuit 50, 70, 80 detects cut-off due to cut-off mechanism removal, and the contactor control circuit 32 turns the contactors 17 OFF.

The above and further objects of the present invention as well as the features thereof will become more apparent from the following detailed description to be made in conjunction with the accompanying drawings.

DETAILED DESCRIPTION OF THE EMBODIMENTS

Figure 1:
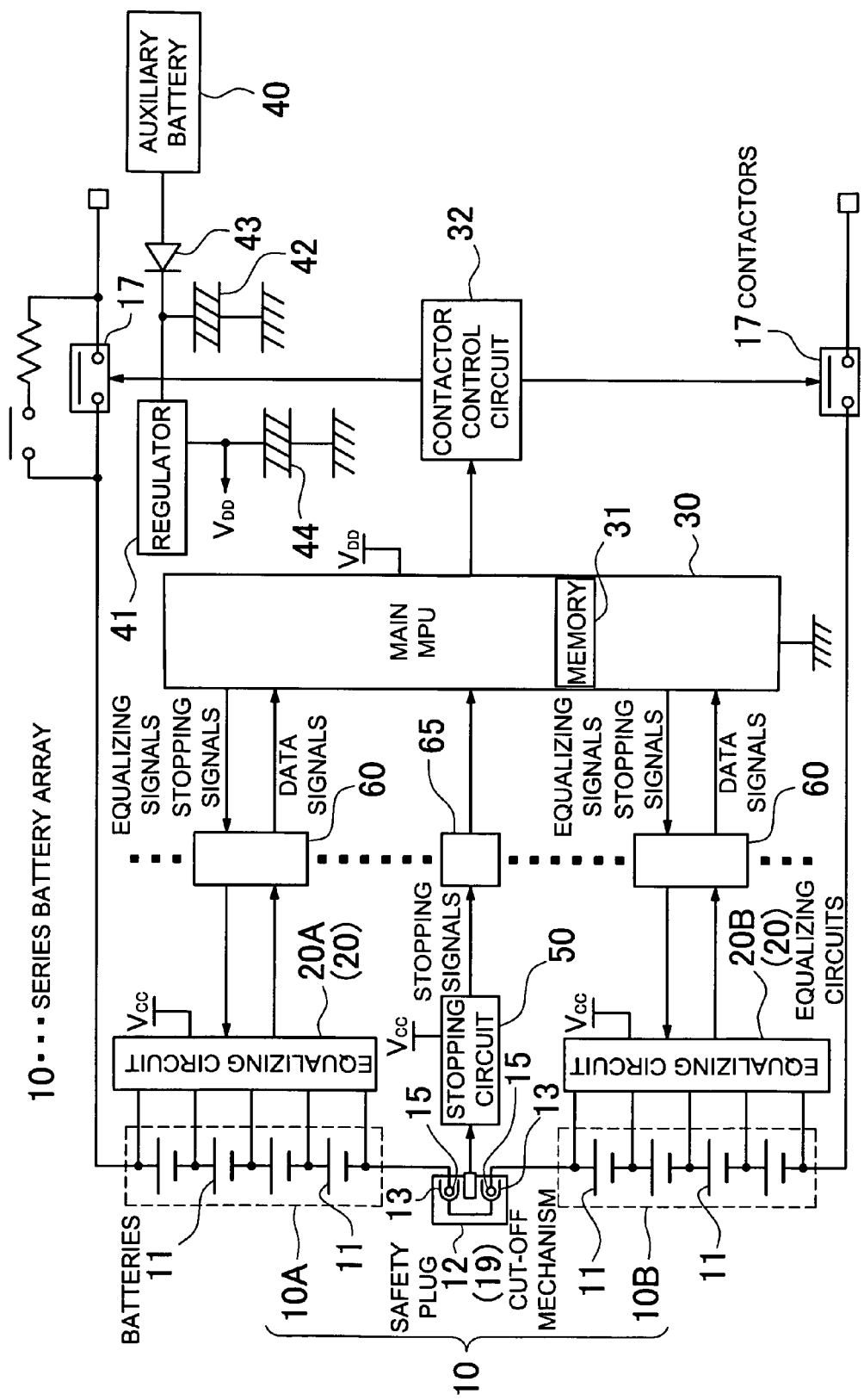
FIG. 1 is a block diagram of a car power source apparatus for one embodiment of the present invention.
Figure 2:
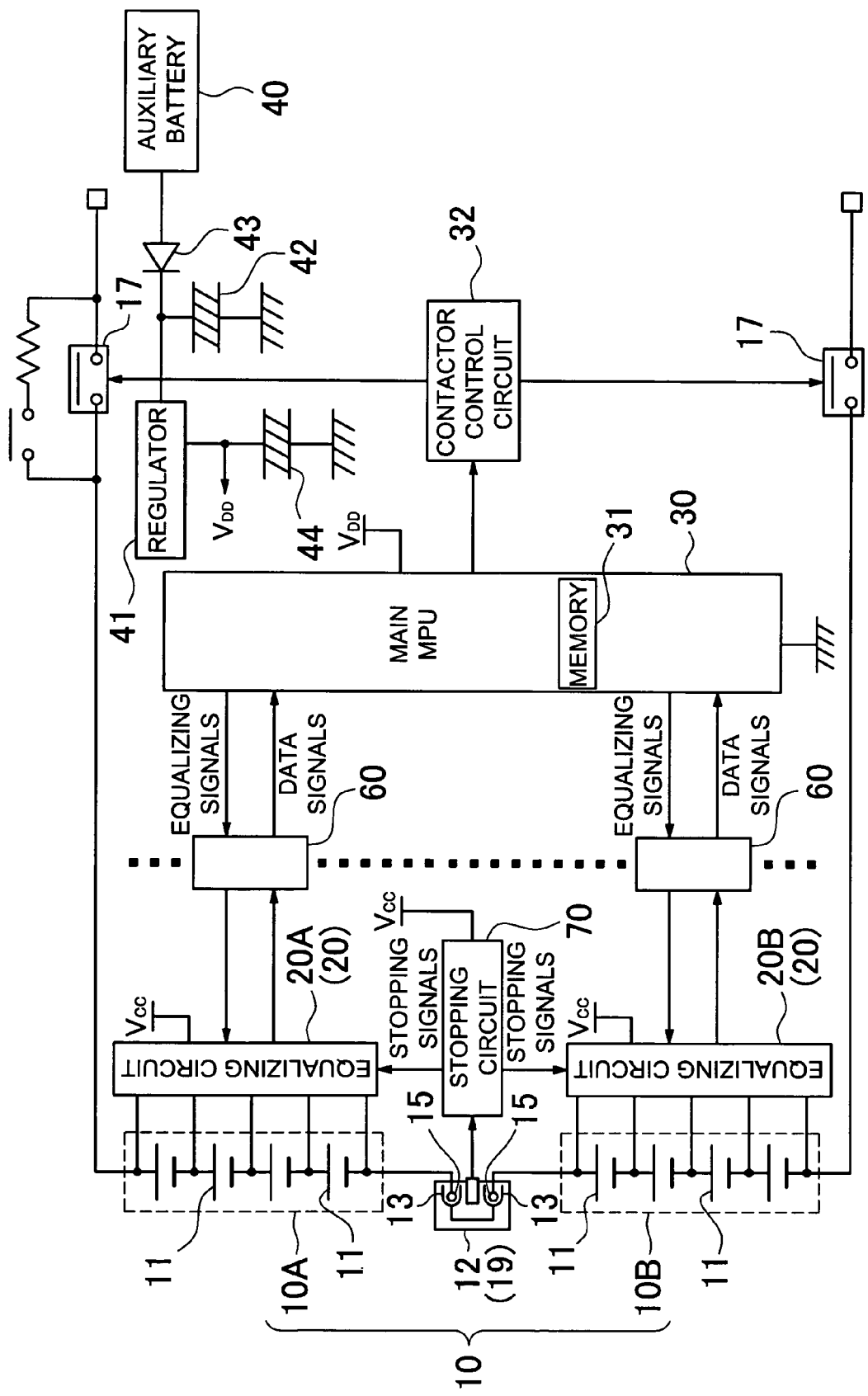
FIG. 2 is a block diagram of a car power source apparatus for another embodiment of the present invention.
Figure 3:
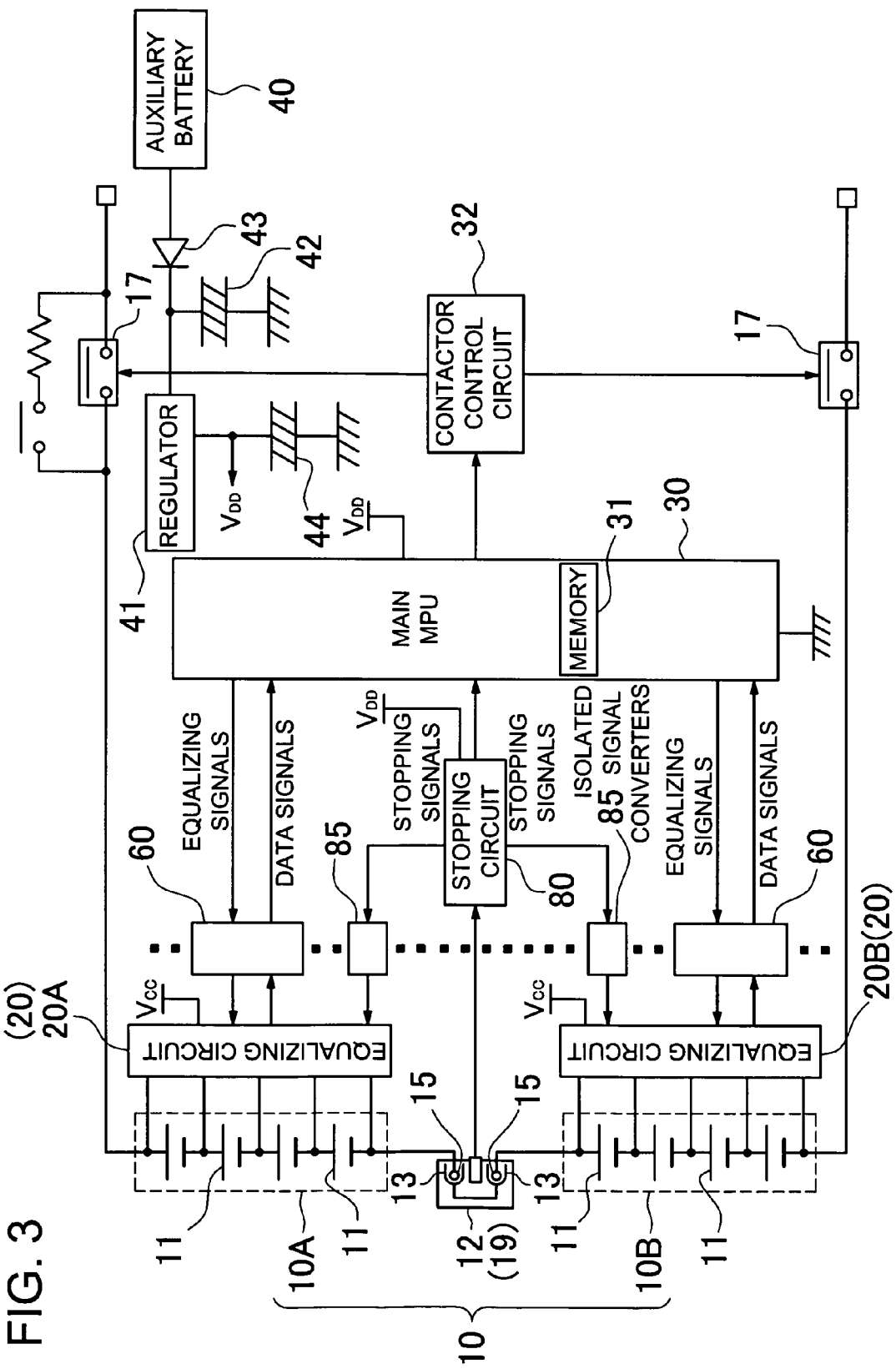
FIG. 3 is a block diagram of a car power source apparatus for another embodiment of the present invention.

The car power source apparatus shown in FIGS. 1-3 are provided with a series battery array 10 having a plurality of rechargeable batteries 11 connected in series to supply power to an electric motor that drives the car, a cut-off mechanism 19 connected in series with the series battery array 10 to disconnect the series connection of the series battery array 10, equalizing circuits 20 that equalize battery 11 electrical characteristics by discharging or charging each of the batteries 11 that make up the series battery array 10, and a stopping circuit 50, 70, 80 that detects cut-off of the series battery array 10 connection due to removal of the cut-off mechanism 19 and stops the equalizing operation of the equalizing circuits 20. In the power source apparatus of the figures, a detachable safety plug 12 serves as the cut-off mechanism 19 connected in series with the series battery array 10. However, a different mechanism such as a circuit breaker can also be used to cut-off the series connection of the series battery array. The following describes in detail embodiments with a safety plug as the cut-off mechanism.

The equalizing circuits 20 equalize the cell voltages of batteries 11 to eliminate imbalance. Batteries 11 of the series battery array 10 are lithium ion rechargeable batteries. However, nickel hydride batteries or nickel cadmium batteries can also be used as the batteries. Ideally, equalizing circuits detect the voltage of a single battery 11 as the cell voltage, and eliminate imbalance between any of the battery 11 cell voltages. However, in the power source apparatus of the present invention, a plurality of batteries can also be connected in series as a battery module, battery module voltage can be the cell voltage, and imbalance between battery module voltages can be eliminated. In a power source apparatus with lithium ion rechargeable batteries as the batteries 11, it is desirable for the cell voltage to be the voltage of one battery. In a power source apparatus with nickel hydride batteries or nickel cadmium batteries, for example, a plurality of batteries are connected in series as a battery module, battery module voltage is the cell voltage, and imbalance between battery module voltages is eliminated.

Figure 4:
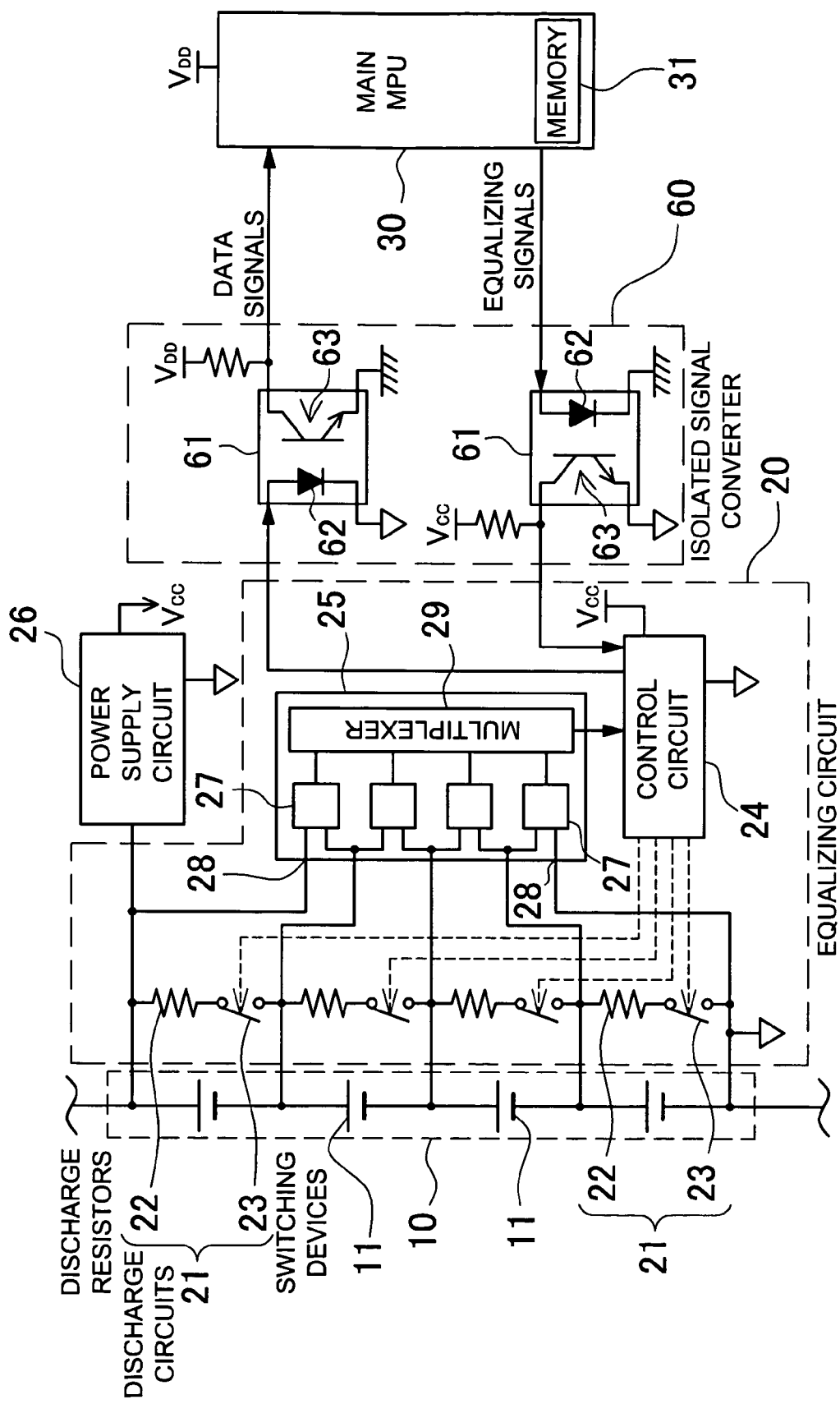
FIG. 4 is a circuit diagram showing an embodiment of an equalizing circuit.

FIG. 4 shows a circuit diagram of an equalizing circuit 20. In the equalizing circuit 20 of FIG. 4, higher voltage batteries 11 are partially discharged through discharge resistors 22 to eliminate battery imbalance. However, the present invention is not limited to a specific equalizing circuit that discharges batteries through discharge resistors. For example, the equalizing circuit can also eliminate battery voltage differences by partially discharging higher voltage batteries into a charge storage device such as a capacitor or battery, then discharging the charge storage device into lower voltage batteries.

The equalizing circuit 20 of FIG. 4 is provided with discharge circuits 21 each having a discharge resistor 22 connected in series with a switching device 23, and a control circuit 24 that determines each cell voltage and controls each switching device 23 ON and OFF. A discharge circuit 21 with a discharge resistor 22 and switching device 23 is connected in parallel with each battery 11. In this equalizing circuit 20, when a battery 11 cell voltage becomes high, the control circuit 24 switches the corresponding switching device 23 ON to discharge that battery 11 through the discharge resistor 22 and equalize batteries 11 by reducing the voltage of that battery 11.

The equalizing circuit 20 of FIG. 4 also has a cell voltage detection circuit 25 that detects the cell voltage of each battery 11. The equalizing circuit 20 with a cell voltage detection circuit 25 is supplied power from the series battery array 10. The equalizing circuit 20 of FIG. 4 operates via output voltage (Vcc) from the power supply circuit 26, which receives power supplied from the series battery array 10. For example, series battery array 10 voltage can be reduced by a power supply circuit 26, which is a DC/DC converter, and then supplied to the equalizing circuit 20. With this circuit structure, even if series battery array 10 voltage is high, it can be supplied to the equalizing circuit 20 at an optimal voltage level. For the cell voltage detection circuit 25 to detect the cell voltage of each battery 11, input terminals of sub-voltage detection circuits 27 are connected across each battery 11. However, a switching circuit (not illustrated) can also be provided at the input-side of a sub-voltage detection circuit to switch connected batteries and detect a plurality of cell voltages with a single sub-voltage detection circuit. Output signals from sub-voltage detection circuits 27 are input to the control circuit 24 via a multiplexer 29. The multiplexer 29 sequentially switches through sub-voltage detection circuit 27 outputs and inputs them to the control circuit 24.

The control circuit 24 compares the cell voltages for each battery 11 and controls the switching devices 23 to equalize the cell voltages of all batteries 11. The control circuit 24 switches ON discharge circuit 21 switching devices 23 to discharge batteries 11 with cell voltages that are too high. As discharge progresses, battery 11 voltage decreases. When a battery 11 voltage drops into balance with other batteries 11, the corresponding switching device 23 is switched from ON to OFF. When the switching device 23 is turned OFF, battery 11 discharge stops. In this manner, the control circuit 24 discharges batteries 11 with high cell voltages to balance the cell voltages of all batteries 11.

The power source apparatus of FIGS. 1-3 are provided with two groups of series battery arrays 10A, 10B. The series battery arrays 10A, 10B are connected in series with a cut-off mechanism 19, which is a safety plug 12, and an equalizing circuit 20A, 20B is connected to each series battery array 10A, 10B. The equalizing circuits 20A, 20B equalize the batteries 11 in each series battery array. 10A, 10B. However, imbalance between the two groups of series battery arrays 10A, 10B is not eliminated. Although not shown in the figures, a power source apparatus with a plurality of series battery arrays can be provided with block discharge circuits having a series connected switching device and discharge resistor for each series battery array. The series battery arrays can be equalized via those block discharge circuits. The block discharge circuits detect the total voltage of each series battery array, and a block control circuit (not illustrated) controls the switching devices ON and OFF. The block control circuit determines the total voltage of each series battery array, switches block discharge circuit switching devices ON for series battery arrays with high detected total voltage, and equalizes the series battery arrays.

The power source apparatus of the figures are each provided with a main MPU (microprocessor unit) 30 that controls equalization via the equalizing circuits 20. An equalizing circuit 20 begins equalizing a series battery array 10 with an equalizing signal from the main MPU 30. The main MPU 30 determines the timing for battery array 10 equalization by the equalizing circuits 20 based on ignition switch position and driving state. When timing conditions allow equalization, the main MPU 30 outputs equalizing signals to the equalizing circuits 20. For example, the main MPU 30 detects the ignition switch in the OFF position and the vehicle stopped, and issues equalizing signals to the equalizing circuits 20.

The main MPU 30 operates on power supplied from the auxiliary car battery 40 (for electrical accessories). In the power source apparatus of FIGS. 1-3, a regulator 41 is connected on the output-side of the auxiliary battery 40. Output voltage is stabilized by this regulator 41 and supplied as the power supply voltage for the main MPU 30. Further, in the power source apparatus of the figures, a capacitor 42, which is charged by the auxiliary battery 40, is connected to the output-side of the auxiliary battery 40. The capacitor 42 is a high capacitance electrolytic capacitor. For example, the capacitor 42 is several hundred μF to several thousand μF, and preferably 1000 μF. The capacitor 42 is connected to the auxiliary battery 40 through a diode 43. The diode 43 is connected with a polarity that allows the auxiliary battery 40 to charge the capacitor 42. The capacitor 42 maintains a specified voltage to supply power to the regulator 41 for a given time after auxiliary battery 40 output voltage has dropped to 0V. In particular, a large capacitance capacitor of several hundred μF or greater can sustain regulator 41 operation for a period as long as several seconds to several tens of seconds, and regulator 41 output voltage (Vdd) can maintain the main MPU 30 in an operational state for that period. In a circuit that charges a capacitor 42 from the auxiliary battery 40 through a diode 43, energy stored in the capacitor 42 is not discharged to the auxiliary battery 40 even if the output-side of the auxiliary battery 40 becomes short-circuited. In that case, while the capacitor 42 is still charged, regulator 41 operation is sustained and power is supplied from the regulator 41 to maintain operation of the main MPU 30. In addition, the power source apparatus of the figures has another capacitor 44 connected at the output-side of the regulator 41. This capacitor 44 is charged by power output from the regulator 41, and it also sustains main MPU 30 operation by providing continued power supply for a given period after auxiliary battery 40 output voltage has dropped.

Figure 5:
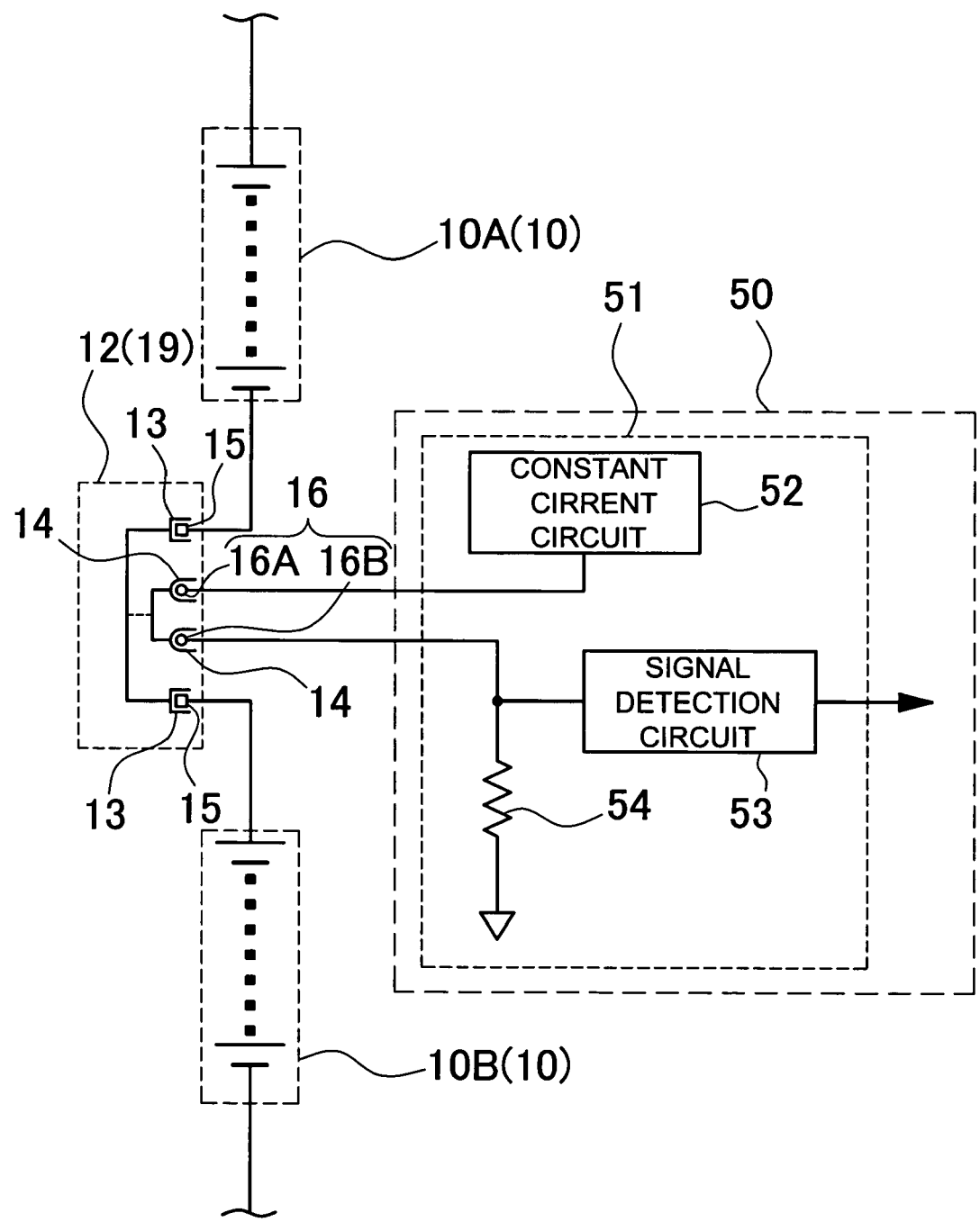
FIG. 5 is a block diagram showing an embodiment of a plug removal detection circuit.

As shown in FIG. 5, the safety plug 12, which is the cut-off mechanism 19, is provided with a pair of main contacts 13 that connects two groups of series battery arrays 10A, 10B in series, and a pair of detection contacts 14 that detects safety plug 12 removal. The pair of main contacts 13 connects with intermediate contacts 15 of the series battery arrays 10A, 10B. When the safety plug 12 is connected, the two groups of series battery arrays 10A,10B are connected in series. If the safety plug 12 is pulled out, the main contacts 13 disconnect from the intermediate contacts 15 cutting-off the connection between the two series battery arrays 10A, 10B resulting in cut-off of the output voltage. The pair of detection contacts 14 is internally connected within the safety plug 12. When the safety plug 12 is connected, the detection contacts 14 are connected to fixed contacts 16 established on the battery-side.

The stopping circuit 50, 70, 80 detects removal of the safety plug 12 and stops battery 11 discharging or charging by the equalizing circuits 20 to stop the equalizing operation. The stopping circuit 50, 70, 80 stops the equalizing operation of the equalizing circuits 20 via the main MPU 30, which controls the equalizing circuits 20, or it directly stops equalizing circuit 20 operation without main MPU 30 intervention.

The stopping circuit 50, 70, 80 detects removal of the safety plug 12, and is provided with a plug removal detection circuit 51 that issues stopping signals to stop the equalizing operation of the equalizing circuits 20. The plug removal detection circuit 51 detects removal of the safety plug 12. FIG. 5 shows a plug removal detection circuit 51. This plug removal detection circuit 51 is provided with a constant current circuit 52 connected to a first fixed contact 16A, and a signal detection circuit 53 connected to a second fixed contact 16B. In addition, the second fixed contact 16B is connected to the stopping circuit 50, 70 ground line via a current resistor 54.

The plug removal detection circuit 51 detects safety plug 12 removal in the following manner. When the safety plug 12 is in the connected state, the detection contacts 14 are connected to the fixed contacts 16. In this state, the two fixed contacts 16 are connected together through the detection contacts 14 of the safety plug 12. Consequently, a set current from the constant current circuit 52 flows through the current resistor 54, and a given voltage is generated across the terminals of the current resistor 54. The signal detection circuit 53 detects the voltage across the current resistor 54, and if that voltage is greater than a prescribed voltage, the signal detection circuit 53 determines that the safety plug 12 is connected. If the safety plug 12 is removed, the two fixed contacts 16 provided on the battery-side become disconnected from the safety plug 12 detection contacts 14. Consequently, current no longer flows through the current resistor 54, and voltage is not generated across the terminals of the current resistor 54. Therefore, the signal detection circuit 53 detects safety plug 12 removal and issues a stopping signal because current resistor 54 voltage is lower than the prescribed voltage. The signal detection circuit 53 stores in memory the prescribed voltage for determining if the safety plug 12 is connected or removed.

The minimum prescribed voltage stored by the signal detection circuit 53 is set, for example, to one half the voltage generated across the current resistor 54 when the safety plug 12 is connected.

The stopping circuit 50, 70, 80 detects safety plug 12 removal via the plug removal detection circuit 51. If safety plug 12 removal is determined, the stopping circuit 50, 70, 80 issues stopping signals for the equalizing circuits 20. Stopping signals output from the stopping circuit 50, 70, 80 are input to the main MPU 30 and input to the equalizing circuits 20 from the main MPU 30, or stopping signals are directly input to the equalizing circuits 20.

In the power source apparatus of FIG. 1, the stopping circuit 50 stops the equalizing operation of the equalizing circuits 20 via the main MPU 30. Stopping signals output from the stopping circuit 50 of the power source apparatus of FIG. 1 are input to the main MPU 30 through an isolated signal converter 65. When the main MPU 30 receives a stopping signal from the stopping circuit 50, it issues control signals to the equalizing circuits 20 through isolated signal converters 60 to stop the equalizing operation. Since this power source apparatus stops equalizing circuit 20 operation via the main MPU 30, which controls the equalizing circuits 20, equalizing circuit 20 operation can be reliably stopped when the safety plug 12 is removed. The stopping circuit 50 of FIG. 1 operates by power supplied from the series battery array 10. This stopping circuit 50 operates off the output voltage (Vcc) of the power supply circuit 26, which is the equalizing circuit 20 power supply. In this power source apparatus, since stopping signals are transmitted from the stopping circuit 50 to the main MPU 30 through an isolated signal converter 65, stopping signals can be transmitted while the stopping circuit 50 and main MPU 30 remain isolated with no common ground.

In the power source apparatus shown in FIGS. 2 and 3, the stopping circuit 70, 80 directly stops the equalizing operation of the equalizing circuits 20 without going through the main MPU 30. Consequently, stopping signals output from the stopping circuit 70, 80 are input directly to the equalizing circuits 20. Stopping signals output from the stopping circuit 70, 80 are input to the control circuit 24 of each equalizing circuit 20. The control circuit 24 detects the stopping signal and stops the equalizing operation. Therefore, this circuit structure can reliably stop equalizing circuit 20 operation even when the main MPU 30 is not functioning. The stopping circuit 70 of FIG. 2 operates by power supplied from the series battery array 10. Specifically, the stopping circuit 70 operates off the output voltage (Vcc) of the power supply circuit 26, which is the equalizing circuit 20 power supply. Therefore, stopping signals from the stopping circuit 70 are input to the equalizing circuits 20 without passing through isolated signal converters. This simplifies circuit structure. The stopping circuit 80 of FIG. 3 operates by power supplied from the car auxiliary battery 40. Specifically, the stopping circuit 80 operates off the output voltage (Vdd) of the regulator 41 connected to the output-side of the auxiliary battery 40. In this power source apparatus, stopping signals output from the stopping circuit 80 are input to the equalizing circuits 20 through isolated signal converters 85. In this power source apparatus, since stopping signals are transmitted from the stopping circuit 80 to the equalizing circuits 20 through isolated signal converters 85, stopping signals can be transmitted while the stopping circuit 80 and equalizing circuits 20 remain isolated with no common ground.

Stopping signals from the stopping circuit 70, 80 are also input to the main MPU 30. The purpose is for detection of safety plug 12 removal by the main MPU 30. In the power source apparatus of FIG. 2, stopping signals input to the equalizing circuits 20 from the stopping circuit 70 are input to the main MPU 30 from the equalizing circuits 20 through the isolated signal converters 60. However, this power source apparatus could also send stopping signals from the stopping circuit to the main MPU through an isolated signal converter in the same manner as the power source apparatus of FIG. 1. In the power source apparatus shown in FIG. 3, since the stopping circuit 80 and main MPU 30 have a common ground, stopping signals output from the stopping circuit 80 are directly input to the main MPU 30 without passing through an isolated signal converter. Specifically, in this power source apparatus, stopping signals output from the stopping circuit 80 are sent to the equalizing circuits 20 and to the main MPU 30. However, in this power source apparatus as well, stopping signals could also be sent to the main MPU through the equalizing circuits in the same manner as the power source apparatus of FIG. 2.

The isolated signal converter 60 shown in FIG. 4 comprises photo-couplers 61. In a photo-coupler 61, control signals, which are pulse signals, output from the main MPU 30 cause light emission from a light emitting diode (LED) 62, and that light is received by a photo-transistor 63. In this manner, control signals are transmitted from the main MPU 30 to an equalizing circuit 20 with the input-side and output-side electrically isolated from each other. The main MPU 30 shown in FIG. 1 sends equalizing signals to equalize the series battery array 10 and stopping signals input from the stopping circuit 50 as control signals to the equalizing circuits 20 through the isolated signal converters 60. The main MPU 30 shown in FIGS. 2 and 3 sends equalizing signals to equalize the series battery array 10 as control signals to the equalizing circuits 20 through the isolated signal converters 60. Instead of photo-couplers, transformer coils can also be used in an isolated signal converter. For example, main MPU output can be connected to a primary coil and equalizing circuit input can be connected to a secondary coil to transmit control signals output from the main MPU to an equalizing circuit in an isolated fashion. Isolated signal converters 60 transmit control signals in an isolated fashion with no common ground from the main MPU 30 to the equalizing circuits 20. Since the power source apparatus of FIGS. 1-3 are provided with two groups of equalizing circuits 20A, 20B, isolated signal converters 60 transmit control signals to both equalizing circuits 20A, 20B.

Further, the isolated signal converter 60 shown in FIG. 4 transmits data from the equalizing circuit 20 control circuit 24 to the main MPU 30. Data such as total series battery array 10 voltage and the voltage each battery 11 detected by the equalizing circuit 20 cell voltage detection circuit 25 are transmitted from the control circuit 24 to the main MPU 30. In this photo-coupler 61, data signals, which are pulse signals, output from the control circuit 24 cause light emission from an LED 62, and that light is received by a photo-transistor 63. In this manner, data signals are transmitted from the control circuit 24 to the main MPU 30 with the input-side and output-side electrically isolated from each other. Therefore, an isolated signal converter 60 can transmit data signals in an isolated fashion with no common ground from the control circuit 24 to the main MPU 30. Further, in the equalizing circuits 20 of FIG. 2, stopping signals input from the stopping circuit 70 are also transmitted as data signals through the isolated signal converters 60 to the main MPU 30.

The main MPU 30 shown in FIGS. 1-3 is provided with memory 31 to store the stopping signal input from the stopping circuit 50, 70, 80. The memory 31 is electrically erasable programmable read only memory (EEPROM) or flash memory. The main MPU 30 retains the stopping signal input from the stopping circuit 50, 70, 80 in memory 31 even after power supplied from the auxiliary battery 40 is cut-off. If a stopping signal is input from the stopping circuit 50, 70, 80, that signal is stored in memory 31. Next, suppose the main MPU 30 is re-booted. Even in that case, the equalizing circuits 20 will not perform the equalizing operation. In this power source apparatus, the equalizing circuits 20 will not start the equalizing operation after auxiliary battery 40 output has dropped. Therefore, if for some reason auxiliary battery 40 voltage drops, equalization of the series battery array 10 will not be performed even after auxiliary battery 40 voltage recovers, and batteries 11 will be safely protected from detrimental effects due to untimely equalization. Subsequently, normal operation of the auxiliary battery 40 can be confirmed and the memory 31 can be reset to establish conditions that allow the equalizing operation to be started.

In the power source apparatus shown in FIGS. 1-3, positive and negative output-sides of the series battery array 10 are connected to output terminals via contactors 17, and these contactors 17 are controlled ON and OFF by a contactor control circuit 32. The contactor control circuit 32 controls the contactors 17 ON and OFF according to control signals input from the main MPU 30. In this power source apparatus, when the stopping circuit 50, 70, 80 detects removal of the safety plug 12, a control signal is output from the main MPU 30 to the contactor control circuit 32, and the contactor control circuit 32 controls the contactors 17 OFF. Because the contactors 17 are controlled OFF to cut-off output when the safety plug 12 is removed, even safer operation of this power source apparatus is achieved.

In the embodiments described above, the safety plug 12, which is the cut-off mechanism 19, is connected in series at an intermediate location in the series battery array 10. However, the cut-off mechanism may also be connected in series between the positive or negative output-side of the series battery array and a contactor. The same results as described above can also be obtained for a power source apparatus of this configuration.

The power source apparatus described above equalize the series battery array in the following manner.

(1) When the Safety Plug 12 is Connected

In the stopping circuit 50, 70, 80, the constant current circuit 52 supplies a specified current to the current resistor 54, a voltage is generated across the current resistor 54, the signal detection circuit 53 detects that voltage, and the plug removal detection circuit 51 determines that the safety plug 12 is connected. Therefore, the plug removal detection circuit 51 does not issue stopping signals to the equalizing circuits 20. In this state, the equalizing circuits 20 are receiving supply voltage from the series battery array 10 and are operating normally. The main MPU 30 determines if series battery array 10 equalization should be performed. If timing conditions allow equalization, the main MPU 30 issues equalizing signals to the equalizing circuits 20. The equalizing signals are input to equalizing circuit 20 control circuits 24 from the main MPU 30 through isolated signal converters 60. An equalizing circuit 20 control circuit 24 contains a sub-MPU or latch circuitry that latches the input equalizing signal. When an equalizing signal is received, the control circuit 24 continuously performs the equalizing operation until the series battery array 10 is equalized. Specifically, the control circuit 24 controls discharge circuit 21 switching devices 23 ON and OFF to equalize the batteries 11.

(1) When the Safety Plug 12 is Removed

When the safety plug 12 is removed during equalization, the stopping circuit 50, 70, 80 detects this and issues a stopping signal to the main MPU 30 or to the equalizing circuits 20. Specifically, when the safety plug 12 is removed, current is no longer supplied to the stopping circuit 50, 70, 80 current resistor 54 from the constant current circuit 52 and voltage is no longer generated across current resistor 54 terminals. The signal detection circuit 53 detects the current resistor 54 voltage drop, and the plug removal detection circuit 51 determines that the safety plug 12 has been removed and issues a stopping signal. This stopping signal is input to equalizing circuit 20 control circuits 24 either directly or via the main MPU 30. The control circuits 24 detect the stopping signal and suspend the equalizing operation.

Finally, the main MPU 30 stores the stopping signal issued from the stopping circuit 50, 70, 80 in memory 31 such as EEPROM or flash memory. A main MPU 30 with a stopping signal stored in memory 31 retains that stopping signal even if power is no longer supplied to the main MPU 30. Therefore, even when power is supplied to a powered-down main MPU 30, the main MPU 30 will suspend battery equalization according to the stopping signal stored in memory 31. Consequently, after cut-off or reduction in auxiliary battery 40 output, the main MPU 30 will still stop equalizing circuit 20 operation as long as the memory 31 is not reset.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2008-113069 filed in Japan on Apr. 23, 2008, the content of which is incorporated herein by reference.

What is claimed is:

1. A car power source apparatus comprising:
a series battery array having a plurality of rechargeable batteries connected in series to supply power to an electric motor that drives a car;
equalizing circuits that equalize battery electrical characteristics by discharging or charging each of the rechargeable batteries that make up the series battery array;
a cut-off mechanism connected in series with the series battery array to disconnect the series connection; and
a stopping circuit to detect a cut-off state of the cut-off mechanism and control the equalizing operation of the equalizing circuits;
wherein the stopping circuit detects the cut-off state due to removal of the cut-off mechanism and stops the equalizing operation of the equalizing circuits.

2. A car power source apparatus as cited in claim 1, wherein the cut-off mechanism is a safety plug connected in series with the series battery array in a removable fashion, the stopping circuit detects safety plug removal, and the stopping circuit stops the equalizing operation of the equalizing circuits.

3. A car power source apparatus as cited in claim 2, wherein the stopping circuit is provided with a plug removal detection circuit that detects safety plug removal and issues stopping signals to stop the equalizing operation of the equalizing circuits.

4. A car power source apparatus as cited in claim 1, wherein a main microprocessor unit (MPU) is provided, which controls the equalizing circuits and has a car auxiliary battery as a power supply, and the stopping circuit stops the equalizing operation of the equalizing circuits via the main MPU.

5. A car power source apparatus as cited in claim 1, wherein the rechargeable batteries are lithium ion batteries.

6. A car power source apparatus as cited in claim 2, wherein two series battery arrays are provided, the two series battery arrays are connected in series via the safety plug, and the equalizing circuits are connected with the series battery arrays, respectively.

7. A car power source apparatus as cited in claim 1, wherein a main MPU that controls the equalizing operation of the equalizing circuits is provided.

8. A car power source apparatus as cited in claim 4, wherein the main MPU controls the equalizing circuits and has the car auxiliary battery as a power supply.

9. A car power source apparatus as cited in claim 8, wherein a regulator is provided at an output-side of the car auxiliary battery, and the regulator stabilizes auxiliary battery output voltage to supply power to the main MPU.

10. A car power source apparatus as cited in claim 9, wherein a capacitor, which is charged by the car auxiliary battery, is connected through a diode to the output-side of the auxiliary battery, the diode is connected with a polarity that allows the auxiliary battery to charge the capacitor, and a given output voltage is maintained to supply the regulator for a given time period after output voltage from the auxiliary battery has dropped.

11. A car power source apparatus as cited in claim 8, wherein power is supplied from the series battery array to an equalizing circuit power supply circuit, and the stopping circuit issues stopping signals to the equalizing circuits through isolated signal converters.

12. A car power source apparatus as cited in claim 11, wherein the stopping circuit transmits stopping signals to the equalizing circuits via isolated signal converters and the main MPU.

13. A car power source apparatus as cited in claim 11, wherein the stopping circuit operates off power supplied from the series battery array.

14. A car power source apparatus as cited in claim 11, wherein the stopping circuit operates off output voltage from a power supply circuit, which is an equalizing circuit power supply.

15. A car power source apparatus as cited in claim 1, wherein a main microprocessor unit (MPU) is provided, and the stopping circuit directly stops the equalizing circuit operation without intervention by the main MPU.

16. A car power source apparatus as cited in claim 15, wherein the stopping circuit and the equalizing circuits operate off power supplied from the series battery array.

17. A car power source apparatus as cited in claim 15, wherein the stopping circuit operates off power supplied by an auxiliary battery, and stopping signals output from the stopping circuit are input to the equalizing circuits through isolated signal converters.

18. A car power source apparatus as cited in claim 15, wherein the stopping circuit issues stopping signals to the equalizing circuits and to the main MPU.

19. A car power source apparatus as cited in claim 18, wherein stopping signals are input to the main MPU from the equalizing circuits through isolated signal converters.

20. A car power source apparatus as cited in claim 19, wherein an isolated signal converter is provided with photo-couplers; a photo-coupler light emitting diode emits light due to pulse signals, which are control signals output from the main MPU; a photo-transistor receives the light emitted by the light emitting diode; and control signals are transmitted from the main MPU to the equalizing circuits with input and output-sides isolated.

21. A car power source apparatus as cited in claim 1, wherein at least one of the equalizing circuits is provided with discharge circuits having a switching device connected in series with a discharge resistor, and a control circuit to detect cell voltages of the rechargeable batteries that make up the series battery array and control the switching devices ON and OFF.

22. A car power source apparatus as cited in claim 1, wherein contactors are connected to the output-side of the series battery array, a contactor control circuit is provided to control the contactors ON and OFF, and the contactor control circuit controls the contactors OFF when the stopping circuit detects cut-off due to disconnection of the cut-off mechanism.

* * * * *